United States Patent [19]

Sauer

[11] Patent Number: 4,682,798
[45] Date of Patent: Jul. 28, 1987

[54] HOSE COUPLING

[75] Inventor: Heinz Sauer, Ronneburg, Fed. Rep. of Germany

[73] Assignee: Rasmussen GmbH, Maintal, Fed. Rep. of Germany

[21] Appl. No.: 887,236

[22] Filed: Jul. 21, 1986

Related U.S. Application Data

[63] Continuation-in-part of Ser. No. 691,902, Jan. 16, 1985, abandoned.

[30] Foreign Application Priority Data

Jan. 20, 1984 [DE] Fed. Rep. of Germany ....... 3401902
Dec. 8, 1984 [DE] Fed. Rep. of Germany ....... 3444817

[51] Int. Cl.$^4$ ............................................. F16L 55/00
[52] U.S. Cl. ..................................... 285/174; 285/307; 285/319; 285/320; 285/347; 285/921
[58] Field of Search ............... 285/174, 319, 320, 347, 285/307, 921, 915

[56] References Cited

U.S. PATENT DOCUMENTS

| 921,691 | 5/1909 | Friday | 285/921 X |
|---|---|---|---|
| 1,043,683 | 11/1912 | Fieser | 285/921 X |
| 1,483,028 | 2/1924 | Walsh | 285/174 |
| 1,589,469 | 6/1926 | Homand | 285/174 |
| 2,809,853 | 10/1957 | Nathan | 285/347 X |
| 3,245,703 | 4/1966 | Manly | 285/921 X |
| 3,394,954 | 7/1968 | Sarns | 285/319 |
| 4,068,870 | 1/1978 | Whitney | 285/921 X |
| 4,076,285 | 2/1978 | Martinez | 285/915 X |
| 4,123,091 | 10/1978 | Cosentino et al. | 285/921 X |
| 4,266,815 | 5/1981 | Cross | 285/915 X |
| 4,462,622 | 7/1984 | Barzuza | 285/921 X |
| 4,462,654 | 7/1984 | Aiello | 285/320 X |
| 4,474,392 | 10/1984 | Vassallo et al. | 285/347 |

Primary Examiner—Richard J. Scanlan, Jr.
Attorney, Agent, or Firm—Peter K. Kontler

[57] ABSTRACT

A hose coupling wherein the end portion of a pipe is sealingly but separably connected with the end portion of a deformable hose by a tubular connector which has a first section sealingly fitted into the end portion of the pipe and a second section preferably sealingly attached to the end portion of the hose. The second section can abut against the end face of the end portion of the hose or it can surround or extend into such end portion. The connector carries one or more pivotable latching devices with pallets which engage a portion of the external surface of the end portion of the pipe or portions of surfaces bounding openings in the end portion of the pipe. A sealing element in the form of an O-ring or a sleeve is inserted between the internal surface of the end portion of the pipe and the external surface of the respective section of the connector to ensure that the seal between the connector and the pipe remains intact even if one of these parts moves axially relative to the other part. The connector shares all axial movements of the end portion of the hose and is separably connected thereto by mechanical means or is permanently bonded to the hose. The pallet or pallets of the latching device or devices can pivot in planes which include the axis of the coupling.

20 Claims, 16 Drawing Figures

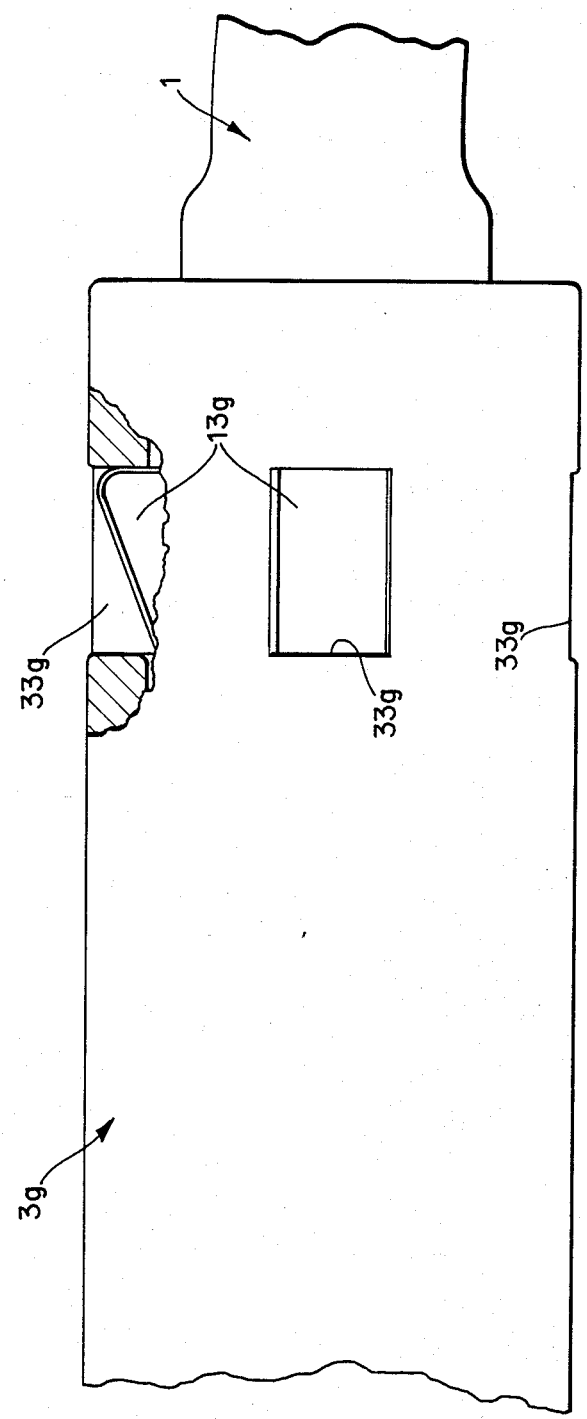

HOSE COUPLING

CROSS-REFERENCE TO RELATED CASE

This is a continuation-in-part of the copending patent application Ser. No. 691,902 filed Jan. 16, 1985, now abandoned.

BACKGROUND OF THE INVENTION

The present invention relates to couplings in general, and more particularly to improvements in couplings (hereinafter called hose couplings) which can be used to establish separable but fluidtight connections between pairs of tubular components, especially between a rigid component and a deformable component. Typical examples of such components are nipples or analogous pieces of pipe (hereinafter called pipes) and hoses consisting of flexible material. Still more particularly, the invention relates to improvements in hose couplings of the type wherein the means for securing the hose to the pipe includes a tubular connector.

German Pat. No. 30 01 991 discloses a hose coupling wherein a pawl is provided on a connector to separably lock the connector to the pipe. The pawl is biased to a locking position, in which its pallet engages a radial shoulder of the pipe, by a torsion spring and the pivot for the pawl is carried by a sleeve which surrounds the connector and is movable axially thereon against the opposition or under the action of a coil spring. The purpose of the coil spring is to urge the sleeve and the pawl thereon in a direction to maintain the pallet of the pawl in engagement with the radial shoulder of the pipe. The coil spring reacts against an external shoulder of the connector and bears against an internal shoulder of the sleeve. One end of the connector has a frustoconical external surface which bears against an O-ring and urges the latter against an internal surface of the pipe under the action of the coil spring.

A drawback of the patented coupling is that it comprises an excessive number of component parts including the aforementioned sleeve, a coil spring and a discrete torsion spring for each pawl. Moreover, several component parts of the patented coupling are rather complicated so that their manufacturing cost contributes significantly to the overall cost of the coupling. Furthermore, the patent does not disclose the manner in which the connector can be secured to the hose.

U.S. Pat. No. 3,394,954 discloses a tube coupling for medical appliances wherein a tubular connector is assembled of several parts and serves to establish a path for the flow of a fluid medium between two rubber tubes. The patented coupling is quite complex and the connections between the connector and the rubber tubes are unreliable.

U.S. Pat. No. 4,123,091 discloses a tube coupling with a positive locking connect and ready disconnect. The coupling has several complex parts and its dimensions, as considered in the radial direction, are quite substantial.

Additional hose couplings are disclosed in U.S. Pat. Nos. 1,043,683, in 1,312,584 and in British Pat. No. 1,334,486. These couplings are not only bulky but also extremely complex so that they and/or their parts cannot be mass-produced at a reasonable cost which is a prerequisite for the utilization of hose couplings in motor vehicles and the like.

OBJECTS AND SUMMARY OF THE INVENTION

An object of the invention is to provide a simple hose coupling wherein the two tubular components can be rapidly and reliably secured to and rapidly disconnected from each other.

Another object of the invention is to provide a novel connector and novel latching means for use in the above outlined hose coupling.

A further object of the invention is to provide a novel pipe and a novel sealing element for use in the improved coupling.

An additional object of the invention is to provide a coupling which invariably ensures the establishment of a leakproof connection between the connector and the pipe, even if the pipe is moved axially of the connector and/or vice versa.

Another object of the invention is to provide a novel method of sealingly securing a pipe to a hose in such a way that the connection is or can be said to be positive but can be readily terminated when the need arises.

A further object of the invention is to provide a coupling which can be used as a superior and less expensive substitute for heretofore known hose couplings under the hoods and in other parts of automotive vehicles.

Another object of the invention is to provide a hose coupling which can connect existing hoses with nipples and analogous tubular components.

The invention resides in the provision of a coupling which comprises a pipe (e.g., a nipple which is rigid with the engine block in a motor vehicle) having a first end portion, a hose having a second end portion, a tubular connector having a first section surrounded by the first end portion and a second section in direct or indirect sealing engagement with and arranged to share axial movements of the second end portion, a sealing element (e.g., an O-ring or a sleeve) which is interposed between the first section and the first end portion to establish and maintain a fluidtight seal between the connector and the pipe while permitting at least some axial movement of the first end portion and the first section relative to each other, and at least one latching device which serves to releasably lock the connector to the pipe. The latching device includes a mobile elastic or rigid first portion which is at least indirectly supported by the connector and a second portion (e.g., a pallet) which is movable into and from engagement with the pipe, e.g., at least in part against the opposition of the first portion (for example, the first portion of the latching device can include a flexible web which yieldably opposes movement of the second portion away from engagement with the pipe). The sealing element preferably engages a cylindrical internal surface of the pipe, and at least a portion of the connector preferably constitutes a metallic or synthetic plastic cylinder. The first portion of the latching device preferably defines for the second portion a pivot axis which is at least substantially tangential to the first end portion so that the second portion of the latching device is movable in a plane which includes the axis of the first end portion. Instead of or in addition to an elastically deformable web, the first portion of the latching device can comprise or constitute a spherical joint which secures the second portion of the latching device to the connector. The second portion of the latching device is preferably accessible, most preferably freely accessible, at the exterior of the first end portion so as to allow for convenient detachment of the second portion of the latching device from the pipe.

In accordance with one presently preferred embodiment of the invention, the second section of the connector is confined in the second end portion and the first portion of the latching device extends from the connector outwardly between the first and second end portions. Also, the second section of the connector can be mechanically secured to the second end portion, e.g., by providing the second section with one or more external ribs and by employing a clamping device which surrounds the second end portion and urges its material against the rib or ribs of the second section. It is preferred to employ a hose whose (second) end portion consists of a deformable material, such as natural or synthetic rubber. The latching device can be provided with an additional portion which bears against the exterior of the second end portion to urge the latter against the rib or ribs of the second section while the second portion of the latching device engages the pipe. The second and additional portions of the latching device are preferably disposed at the opposite sides of the first portion, as considered in the axial direction of the two end portions, and the additional portion of the latching device can slope inwardly toward the axis of the second end portion in a direction away from the first end portion. The second section of the connector can be provided with one or more external grooves adjacent to the rib or ribs, and the additional section of the latching device can be arranged to urge the material of the second end portion into at least one such groove when the second portion of the latching device engages the pipe, i.e., when the pipe is locked against axial movement relative to the hose and connector.

The inner side of the second portion (e.g., the aforementioned pallet) of the latching device can slope toward the axis of the first end portion in a direction away from the second end portion. This enables the second portion of the latching device to slide over a radially extending shoulder at the free end of the first end portion in order to allow for disengagement of the pipe from the hose in response to the application of an excessive axial stress to the first and/or second end portion in a direction to move such end portions apart. The second portion of the latching device can engage a radial shoulder, a cylindrical portion or a frustoconical portion of the external surface of the first end portion.

The aforementioned additional portion of the latching device can be designed to facilitate disengagement of the second portion from the pipe. To this end, the additional portion can slope outwardly and away from the axis of the second end portion in a direction away from the first end portion.

The second section of the connector can be bonded, e.g., vulcanized, to the second end portion, and such second section can be surrounded by or it can surround the second end portion. For example, the second end portion can surround the second section of the connector and can but need not necessarily abut the first end portion. Alternatively, the second end portion can be received between the second section of the connector and the first end portion, for example, in such a way that the second end portion is surrounded by the first end portion and surrounds the second section. It is also possible to design the coupling in such a way that one of the two end portions (particularly the first end portion) surrounds the other end portion; this contributes to the establishment of a highly reliable fluidtight seal between the two end portions).

The sealing element can comprise at least one circumferentially complete deformable sealing lip which is in sealing contact with the preferably cylindrical internal surface of the first end portion, and such sealing lip can be integral with the second end portion (i.e., the sealing element can constitute an integral part of the hose).

The second section and the second end portion can be disposed end-to-end and their abutting end faces can be bonded (e.g., vulcanized) to each other. For example, the connector can include a flange-like third section which is disposed between the first and second sections (or which can constitute or form part of the second section) and has one of the aforementioned end faces which are bonded to each other.

The sealing element can be received in an external groove of the first section of the connector or it may be bonded (e.g., vulcanized) to the connector. The second section of the connector can surround a portion of the sealing element.

It is also possible to provide the first end portion with an opening through which the latching device extends radially outwardly or which receives at least the major part of the latching device. The latter is then preferably (but not necessarily) integral with the connector.

The second portion of the latching device can be fully received in the opening of the first end portion.

The coupling can comprise a plurality of latching devices, and the first end portion can be provided with a discrete opening for each latching device or with a single opening for, for example, two latching devices. The latching devices are preferably equidistant from one another in the circumferential direction of the first end portion. The opening or openings can be adjacent to the second end portion.

The second section of the connector can include a cylindrical first portion which is received in the second end portion and a cylindrical second portion which is disposed between the first portion of the second section and the first section and is integral with the latching device or devices.

The connector is or can be slightly elastic and the first portion of each latching device is preferably movable to and from a normal or operative position in which it holds the second portion of the latching device in the opening of the second end portion.

The novel features which are considered as characteristic of the invention are set forth in particular in the appended claims. The improved hose coupling itself, however, both as to its construction and the mode of operating the same, together with additional features and advantages thereof, will be best understood upon perusal of the following detailed description of certain specific embodiments with reference to the accompanying drawing.

BRIEF DESCRIPTION OF THE DRAWING

FIG. 16 is an elevational view of the coupling which is shown in FIG. 15.

DESCRIPTION OF THE PREFERRED EMBODIMENTS

Figure 1:
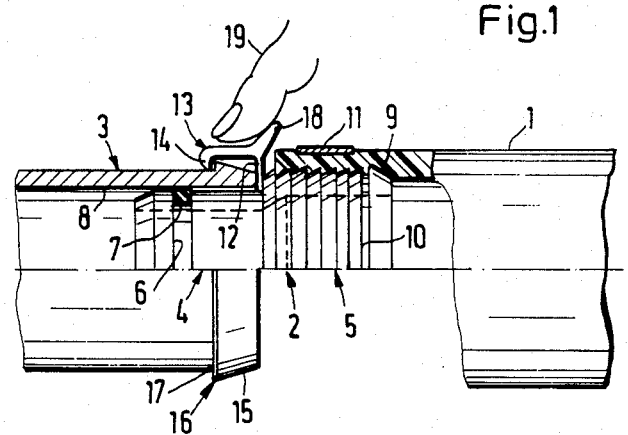
FIG. 1 is a fragmentary partly elevational and partly axial sectional view of a coupling which embodies one form of the invention and wherein the end portion of the hose is mechanically secured to the respective section of the connector by a bandshaped clamping device.

Referring first to FIG. 1, there is shown a coupling which comprises a first tubular component 3 (hereinafter called pipe for short) which can constitute a metallic nipple forming part of an engine block in a motor vehicle, a second tubular component 1 (hereinafter called hose) which can consist of an elastomeric material (such as EPDM, silicone rubber or another rubber-like substance), a tubular connector 2 having a first section 4 surrounded by the end portion of the pipe 3 and a second section 5 surrounded by the end portion of the hose 1, and a sealing element 7 in the form of an O-ring which is interposed between the cylindrical internal surface 8 of the end portion of the pipe 3 and the external surface of the section 4. The hose 1 need not necessarily consist of a pronouncedly elastomeric material, i.e., its material can be hard or substantially hard as long as the end portion of the hose 1 can be properly slipped onto the second section 5 of the connector 2. That portion of the connector 2 which constitutes the section 4 is a cylinder having a circumferentially complete external groove 6 for the major portion of the sealing element 7. The latter is inserted in prestressed condition and ensures that the end portion of the pipe 3 is and remains in sealing engagement with the first section 4 even if the connector 2 is shifted axially of the pipe 3 and/or vice versa, as long as the sealing element 7 remains in contact with the cylindrical internal surface 8 of the end portion of the pipe 3. The connector 2 is preferably made of a relatively hard but at least slightly elastomeric synthetic plastic material such as polyamide which is reinforced by glass fibers.

The external surface of the second section 5 of the connector 2 is provided with a first circumferentially complete rib 9 having a frustoconical flank which slopes toward the axis of the connector 2 in a direction away from the section 4 and a radial flank which faces toward the pipe 3. The external surface of the section 5 is further provided with a set of additional ribs 10 each of which has a substantially sawtooth shaped profile and has a frustoconical flank sloping toward the axis of the connector 2 in a direction toward the section 4 as well as a radially extending flank facing away from the pipe 3. The maximum diameters of the additional ribs 10 are preferably smaller than the maximum diameter of the rib 9, and at least some of the ribs 10 are surrounded by a band-like metallic or plastic clamp 11 which biases the material of the end portion of the hose 1 into the annular spaces between the ribs 10 therewithin. The mechanical connection between the second section 5 of the connector 2 and the end portion of the hose 1 is similar or analogous to that which is disclosed in the commonly owned copending patent application Ser. No. 613,755 filed May 23, 1984 by Heinz Sauer for "Sleeve coupling for hoses".

In accordance with a feature of the invention, the improved coupling further comprises at least one pawl-shaped latching device 13 which is integrally secured to an intermediate portion of the connector 2 by a web 12 forming part of or constituting a first portion of the device 13. The latter further comprises a pallet-shaped second portion 14 which releasably engages the pipe 3 to hold the connector 2 against axial movement in a direction to the right, as viewed in FIG. 1, and an additional or third portion 18 which can be actuated by a finger 19 to disengage the pallet-shaped second portion 14 from the pipe 3 so that the latter can be disconnected from the section 4 against the opposition of the sealing element 7 which is in frictional and sealing engagement with the internal surface 8 and is confined in the external groove 6 of the section 4. The web 12 is disposed between the end portions of the pipe 3 and hose 1 and is elastic. Thus, when the additional or third portion 18 of the latching device 13 is to be depressed toward the external surface of the end portion of the hose 1, the finger 19 must overcome the resistance of the web 12 in order to disengage the portion or pallet 14 from an external radially extending shoulder 17 of a circumferentially complete tooth-shaped portion or bead 16 of the pipe 3. The bead 16 has a frustoconical surface 15 which tapers toward the axis of the pipe 3 in a direction away from the radial shoulder 17. The elasticity of the web 12 is such that the portion or pallet 14 normally tends to engage the shoulder 17, and the third or additional portion 18 of the latching device 13 then slopes outwardly in a direction away from the axis of the hose 1 and away from the end portion of the pipe 3.

When the first section 4 of the connector 2 is introduced into the end portion of the pipe 3, the second portion or pallet 14 of the latching device 13 rides over the frustoconical flank 15 of the bead 16 against the opposition of the elastically deformable web 12 and thereupon snaps behind the shoulder 17 to hold the connector 2 against separation from the pipe 3. The bias of the web 12 suffices to ensure that the second portion or pallet 14 of the latching device 13 remains in engagement with the radial shoulder 17 unless the finger 19 of an operator depresses the third or additional portion 18 so as to pivot the latching device 13 in a plane including the axis of the connector 2, i.e., about an axis which is defined by the web 12 and extends substantially tangentially of the end portion of the pipe 3.

The ability of the improved coupling to resist separation of the first section 4 of the connector 2 from the end portion of the pipe 3 can be enhanced by providing the connector 2 with two or more latching devices 13, e.g., with two latching devices which are disposed diametrically opposite each other with reference to the common axis of the connector 2 and the end portions of the pipe 3 and hose 1. If the connector 2 carries two or more latching devices, such devices are preferably of identical size and shape and are preferably equidistant from one another, as considered in the circumferential direction of the coupling. The third or additional portions 18 of two or more latching devices 13 can be depressed by one hand and at the same time to ensure a convenient and rapid separation of the first section 4 from the end portion of the pipe 3 when the need for such separation arises.

The web 12 may but need not necessarily store energy when the pallet 14 engages the radially extending shoulder 17 of the bead 16. However, the web 12 preferably stores energy while the pallet 14 rides over the frustoconical flank 15 in a direction toward the shoulder 17. This reduces the likelihood of accidental separation of the latching device 13 from the bead 16, i.e., it is necessary to depress the third or additional portion 18 in order to allow for separation of the first section 4 from the end portion of the pipe 3.

An important advantage of the improved coupling is that it can dispense with the springbiased sleeve which surrounds the tubular connector of the coupling shown in the aforediscussed German Pat. No. 30 01 991. Moreover, the improved coupling dispenses with a ring-shaped retainer for the sleeve which is used in the German patent as well as with the coil spring and with the torsion spring or springs of the patented coupling. Still further, the internal surface of the pipe 3 need not be provided with a frustoconical portion such as that in the pipe which is used in the coupling of the German patent and is engaged by the sealing element. The omission of the coil spring reduces the effort which must be exerted in order to connect the pipe 3 with or to disconnect the pipe from the hose 1. Still further, the improved coupling can be readily manipulated by a robot in an automated automobile assembling or other plant. The mechanical connection between the connector section 5 and the end portion of the hose 1 by means of a simple clamp 11 or the like can be established in the manufacturing plant rather than at the locale of use so that the attachment of the hose 1 to the pipe 3 takes up even less time since it merely involves insertion of the connector section 4 into the end portion of the pipe 3. The sealing element 7 is or can be inserted into the groove 6 at the locale of assembling the connector section 5 with the end portion of the hose 1.

The feature that the web 12 of the first portion of the latching device 13 is integral with the connector 2 also contributes to lower cost and simplicity of the improved coupling. Thus, it is not necessary to provide a discrete pintle or the like for each latching device 13 and it is not necessary to provide a discrete spring (such as the torsion spring which is shown in the afore-mentioned German patent) to bias the pallet 14 of the latching device 13 into engagement with the pipe 3.

An additional important advantage of the improved coupling is its simplicity. Thus, even an unskilled person can immediately perceive the purpose and mode of manipulation of the readily observable and readily accessible latching device or devices 13 so that the mode of operation of the improved coupling need not be described in detail in expensive manuals and the person in charge of assembling or taking apart the improved coupling need not require any training for proper manipulation of the latching device or devices 13.

Still another important advantage of the improved coupling is its compactness. Thus, the coupling does not contribute to the combined axial length of the pipe 3 and hose 1 since the end face of the end portion of the hose 1 can be moved into immediate or very close proximity of the end face of the end portion of the pipe 3. All that is necessary is to leave an extremely narrow gap for the passage of the web 12 radially outwardly so that the second and third portions 14 and 18 of the latching device 13 can be located externally of the end portions of the pipe 3 and hose 1. Compactness of the coupling is highly desirable, not only because it entails a reduction of the initial cost for the material of the parts 2 and 13 but also because the coupling occupies less room under the hood of a motor vehicle if the improved coupling is used in connection with the assembly of automobiles.

Figure 2:
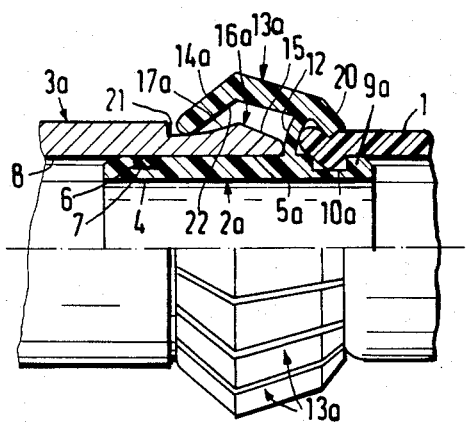
FIG. 2 is a fragmentary partly elevational and partly axial sectional view of a second coupling with a modified latching devices which forms part of the means for mechanically securing the end portion of the hose to the respective section of the connector.

FIG. 2 shows a second coupling which employs a modified tubular connector 2a and a pipe 3a having a modified end portion surrounding the respective section 4 of the connector 2a. The section 5a extends into the end portion of the hose 1 and has a circumferentially complete external rib 9a as well as a circumferentially complete external groove 10a inwardly adjacent to the rib 9a and receiving a part of the end portion of the hose 1 under the action of a third or additional portion 20 of a modified latching device 13a. The manner in which the sealing element 7 is received in the external groove 6 of the section 4 of the connector 2a and engages the cylindrical internal surface 8 of the end portion of the pipe 3a is the same as described in connection with FIG. 1. The connector 2a is preferably made of a relatively stiff but at least slightly elastomeric material, such as polyamide which is reinforced by glass fibers. The first portion of the latching device 13a constitutes a web 12 which is elastic and tends to maintain the second portion or pallet 14a of the device 13a in engagement with the cylindrical portion 21 of the external surface of the end portion of the pipe 3a. The cylindrical portion 21 is inwardly adjacent to a frustoconical surface or flank 17a which slopes toward the axis of the end portion of the pipe 3a in a direction away from the hose 1. The circumferentially complete bead 16a of the end portion of the pipe 3a is further formed with a frustoconical surface of flank 15 which tapers in a direction toward the axis of the end portion of the hose 1 and facilitates the movement of the pallet 14a over the radially outermost part of the bead 16a, along the frustoconical flank 17a and into engagement with the cylindrical portion 21 of the external surface of the pipe 3a. When the pallet 14a bears against the cylindrical portion 21a, the third or additional portion 20 of the latching device 13a bears against the external surface of the end portion of the hose 1 and urges the material of such end portion against the rib 9a as well as into the external groove 10a of the section 5a. As can be seen in FIG. 2, the connector 2a can be provided with a complete annulus of closely adjacent latching devices 13a to thus ensure that the first section 4 of the connector 2a is held in the end portion of the pipe 3a with a required force as well as that the second section 5a is maintained in pronounced sealing engagement with the surrounding end portion of the hose 1 even though the section 5a does not exhibit the ribs 10 of the section 5 shown in FIG. 1. The bias of each web 12 is sufficiently pronounced to maintain the respective pallet 14a in strong frictional engagement with the cylindrical portion 21 of the external surface of the end portion of the pipe 3a which latter, in turn, ensures that the third or additional portions 20 of the latching devices 13a maintain at least some material of the elastically deformable end portion of the hose 1 in the groove 10a and in sealing engagement with the rib 9a. It will be noted that, in contrast to the additional portion 18 of the latching device 13 shown in FIG. 1, the third or additional portions 20 of the latching devices 13a shown in FIG. 2 slope toward the axis of the hose 1 in a direction away from the end portion of the pipe 3a. The force with which the third or additional portions 20 of the latching devices 13a urge the material of the end portion of the hose 1 into the groove 10a of the second section 5a decreases somewhat as the pallets 14a ride beyond the crests between the frustoconical flanks 15 and 17a of the bead 16a, but such force is still sufficient to ensure reliable retention of the first section 4 in the end portion of the pipe 3a, i.e., to prevent accidental separation of the parts 3a or a separation of such parts in response to the exertion of a relatively small axially oriented force upon the end portion of the pipe 3a upon the connectr 2a. Furthermore, the deforming action of the third or additional portions 20 upon the end portion of the hose 1 can be readily selected in such a way that the end portion of the hose 1 cannot be readily or accidentally separated from the section 5a while the pallets 14a a bear against the cylindrical portion 21 of the external surface of the end portion of the pipe 3a. The pallets 14a are biased against the cylindrical portion 21 under the action of the elastically deformed webs 12 as well as under the action of the elastically deformed end portion of the hose 1, i.e., of that part of the hose which is engaged by the third or additional portions 20 of the latching devices 13a.

The necessary deformation of the end portion of the hose 1 (and the penetration of the material of such end portion into the groove 10a) is ensured by appropriate selection of the dimensions of various components of the coupling which is shown in FIG. 2. Thus, the diameter of the circle which is defined by the innermost parts or tips of the third or additional portions 20 of the latching devices 13a shown in FIG. 2 when the pallets 14a of such latching devices engage the cylindrical portion 21 of the external surface of the end portion of the pipe 3a is less than the maximum diameter of the second section 5a plus two wall thicknesses of the hose 1 in undeformed condition of the latter. In fact, adequate deformation of the end portion of the hose 1 is assured even if the diameter of the circle defined by the tips of the third or additional portions 20 is less than the diameter of the surface at the bottom of the groove 10a plus two wall thicknesses of the hose 1 in undeformed condition of the latter. The deformed end portion of the hose 1 bears against the rib 9a as well as against the circumferentially complete edge at the inner end of the groove 10a (as considered in the axial direction of the section 5a), and such deformation of the end portion of the hose 1 at both axial ends of the groove 10a ensures that the end portion of the hose is mechanically held against axial movement with reference to the second section 5a (and/or vice versa) with a rather pronounced force as well as that the parts 2a and 1 remain in continuous sealing engagement with one another.

If the coupling of FIG. 2 is subjected to the action of an axially oriented force which tends to separate the second section 5a from the hose 1, e.g., to the action of a force which tends to move the end portion of the hose 1 axially and away from the end portion of the pipe 3a and/or vice versa, the pallets 14a of the latching devices 13a slide along the frustoconical flank 17a of the bead 16a toward the crest between the flanks 15 and 17a so that the tips of the third or additional portions 20 move nearer to the axis of the second section 5a and subject the end portion of the hose 1 to an even more pronounced deforming action. Thus, the resistance which the third or additional portions 20 of the latching devices 13a offer to separation of the hose 1 from the second section 5a of the connector 2a increases in response to an increase of the force which tends to separate the hose 1 from the connector 2a. Such increase in the resistance of third or additional portions 20 to separation of the hose 1 from the second section 5a takes place simultaneously with an increase of the resistance which the pallets 14a of the latching devices 13a offer to separation of the first section 4 from the end portion of the pipe 3a. This will be readily appreciated by bearing in mind that the pallets 14a begin to engage the frustoconical flank 17a as soon as they are forced to leave the cylindrical portion 21 of the external surface of the end portion of the pipe 3a on their way toward the end face of the pipe. Thus, the coupling of FIG. 2 can be disengaged only in response to the exertion of a force which suffices to subject the latching devices 13a to a deformation such as is required to slide the tips of the pallets 14a over the frustoconical flank 17a and onto the frustoconical flank 15 of the bead 16a. Separation of the first section 4 of the connector 2a from the end portion of the pipe 3a can be facilitated by an operator who urges the third or additional portions 20 deeper into the material of the end portion of the hose 1, i.e., nearer to the external surface of the second section 5a. This can be effected by finger pressure or by using a flexible element which is placed around the outer sides of the third or additional portions 20 and is tightened around the coupling. It is equally within the purview of the invention to provide each of the latching devices 13a with an additional portion corresponding to the portion 18 of the latching device 13 to facilitate separation of the first section 4 of the connector 2a from the end portion of the pipe 3a. Such additional portions facilitate the task of causing the third portions 20 to move nearer to the periphery of the second section 5a.

FIG. 2 shows that the internal surfaces or inner sides 22 of the pallets 14a slope toward the axis of the pipe 3a in a direction away from the end portion of the hose 1 when the pallets 14a engage the cylindrical portion 21 of the external surface of the pipe. The slope of the surfaces or sides 22 is more pronounced than the slope of the frustoconical flank 17a of the bead 16a. Such inclination of the inner sides 22 of the pallets 14a renders it possible to replace the bead 16a with a bead of the type shown in FIG. 1, i.e., with a bead having a frustoconical flank 15 and a radial flank or shoulder corresponding to the shoulder 17 shown in FIG. 1. The inner sides 22 of the pallets 14a can slide over the radial shoulder 17 when the first section 4 of the connector 2a shown in FIG. 2 is in the process of being separated from a pipe having an end portion of the type shown in FIG. 1 (i.e., with a bead 16 having a frustoconical flank 15 and a radial shoulder 17). Still further, it is possible to replace the pallets 14a of the latching devices 13a with pallets (14) of the type shown in FIG. 1, i.e., with pallets whose inner sides extend substantially radially of the end portion of the pipe 3 or 3a when such pallets engage the cylindrical surface portion 21 of the pipe, depending on the configuration of the bead on the pipe which is used with a connector 2a having an annulus of latching devices 13a with pallets 14 in lieu of pallets 14a. The just described modification can be resorted to with particular advantage when the end portion of the pipe has a bead 16a i.e., a bead with two mutually inclined frustoconical flanks 15 and 17a.

It will be seen that the outer sides of the latching devices 13 and 13a are readily accessible from the exterior of the respective coupling. This affords convenient access to the portion 18 of the latching device 13 and to the portion 20 of the latching devices 13a for the purpose of facilitating separation of the first section 4 of the connector 2 or 2a from the end portion of the pipe 3 or 3a.

Figure 3:
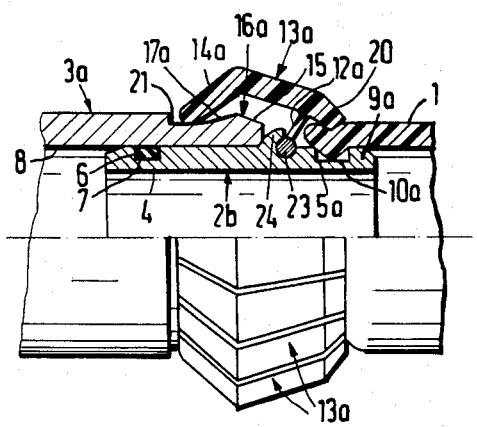
FIG. 3 is a similar view of a coupling which constitutes a modification of the coupling of FIG. 2 and whose latching devices are secured to the connector by spherical joints.

The coupling of FIG. 3 differs from the coupling of FIG. 2 in that the first portion of each latching device 13a comprises or constitutes a spherical joint enabling the portions 14a and 20 to pivot in a plane which includes the axis of the coupling, i.e., about an axis which is tangential to the connector 2b. The web 12a of the first portion of each latching device 13a shown in FIG. 3 has a sphere 23 extending into a complementary socket 24 of the connector 2b. It will be appreciated that the connector 2b of FIG. 3 can carry two or more latching devices 13a of the type shown in FIG. 2 and two or more latching devices 13a with spherical joints 23, 24 and webs 12a.

The couplings of FIGS. 2 and 3 exhibit the advantage that the latching devices 13a not only secure the connector 2a or 2b to the pipe 3a but also that their portions 20 constitute component parts of the means for mechanically locking the end portion of the hose 1 to the section 5a of the connector 2a or 2b. Thus, the clamp 11 of the coupling which is shown in FIG. 1 can be omitted. Moreover, and as explained above, the resistance which the portions 20 of the latching devices 13a offer to separation of the hose 1 from the section 5a of the connector 2a or 2b increases in response to increasing tendency of the end portion of the pipe 3a to become separated from the section 4 of the connector 2a or 2b at a time when such separation is not desired. Still further, the preferably elastic material of the end portion of the hose 1 assists the webs 12 and 12a of FIGS. 2 and 3 in maintaining the pallets 14a of the latching devices 13a in pronounced engagement with the cylindrical portion 21 of the external surface of the pipe 3a because the material of the hose 1 tends to pivot the latching devices 13a in a counterclockwise direction, as viewed in FIG. 2 or 3, through the medium of the portions 20. In fact, the webs 12 or 12a of FIG. 2 or 3 need not be elastic at all (i.e., they need not contribute to retention of the pallets 14a in engagement with the respective cylindrical portions 21) because such function can be taken over entirely by the material of the end portion of the hose 1.

The portions 20 of the latching devices 13a can establish a reliable seal between the end portion of the hose 1 and the section 5a of the connector 2a or 2b even if the groove 10a of FIG. 2 or 3 is omitted. However, the provision of such groove contributes significantly to the reliability of sealing action which is established between the external surface of the section 5a and the internal surface of the end portion of the hose 1. Flexing of a part of the end portion of the hose 1 into the groove 10a under the action of portions 20 of the latching devices 13a has been found to greatly reduce the likelihood of leakage of a gaseous or hydraulic fluid between the section 5a and the hose 1. Furthermore, reliability of the sealing action between the hose 1 and the section 5a increases when the end portion of the pipe 3a tends to become separated from the section 4 of the connector 2a or 2b due to the afore-discussed cooperation between the pallets 14a and the frustoconical flank 17a of the bead 16a. The inclination of the inner sides 22 in the aforediscussed manner also contributes to a more reliable cooperation between the pallets 14a and the bead 16a in enhancing the sealing action of portions 20 when the end portion of the pipe 3a tends to become separated from the section 4 of the connector 2a or 2b or vice versa. However, and as already mentioned above, the pallets 14a can cooperate with the flank 17a to enhance the sealing action of the portions 20 even if the inner sides of the pallets 14a extend radially or substantially radially of the end portion of the pipe 3a.

Figure 4:
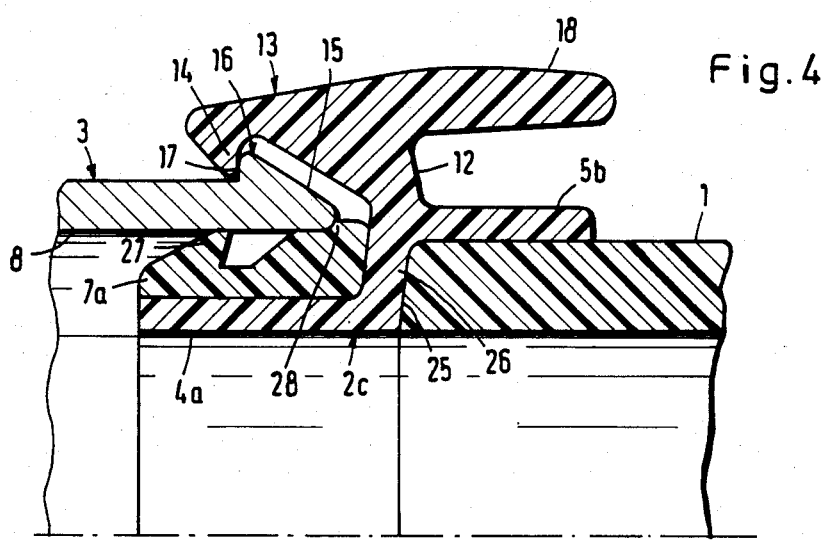
FIG. 4 is a fragmentary axial sectional view of a fourth coupling with a modified sealing element and a connector which surrounds the end portion of the hose.

FIG. 4 illustrates a fourth coupling wherein the first section 4a of a modified connector 2c is surrounded by the end portion of the pipe 3 and the second section 5b of the connector 2c surrounds the end portion of the hose 1. The sections 4a and 5b are integrally connected to each other by a radially extending third section or flange 26 having an annular end face 25 which abuts against and is vulcanized or otherwise bonded to the adjacent end face of the end portion of the hose 1. The connector 2c can be made of polyamide. If desired, the cylindrical external surface of the end portion of the hose 1 can be bonded to the cylindrical internal surface of the second section 5b to even further reduce the likelihood of separation of the parts 1, 2c and/or leakage of fluid between such parts. The hose 1 can be vulcanized to the section 5b and/or flange 26 by heating to a temperature between 170° and 180° C. and subsequent cooling. The bonding operation renders it possible to simplify the design of the section 5b, i.e., such section need not be provided with one or more external ribs and/or grooves.

The sealing element of the coupling which is shown in FIG. 4 is a sleeve-like element 7a having a cylindrical internal surface which is bonded (e.g., vulcanized) to the cylindrical external surface of the section 4a and one or more elastically deformable circumferentially complete external lips 27 in sealing engagement with the cylindrical internal surface 8 of the end portion of the pipe 3. The external surface of the sealing element 7a is further provided with a circumferentially complete bead 28 whose outer diameter (in undeformed condition of the sealing element 7a) exceeds the diameter of the internal surface 8 so that the bead 28 undergoes at least some deformation and sealingly engages the surface 8 when it is forced (either entirely or in part) into the end portion of the pipe 3. The bead 28 is immediately adjacent to the respective side of the third section or flange 26 of the connector 2c.

The latching device 13 of the coupling shown in FIG. 4 is analogous to the latching device 13 of FIG. 1. Also, the bead 16 at the free end of the end portion of the pipe 3 is similar to or identical with the bead 16 of the pipe which is shown in FIG. 1. The only difference between the latching devices 13 of FIGS. 1 and 4 is that the additional portion 18 of the latching device shown in FIG. 4 extends in substantial parallelism with the axis of the coupling when the pallet 14 engages the radially extending shoulder 17 of the bead 16.

Figure 5:
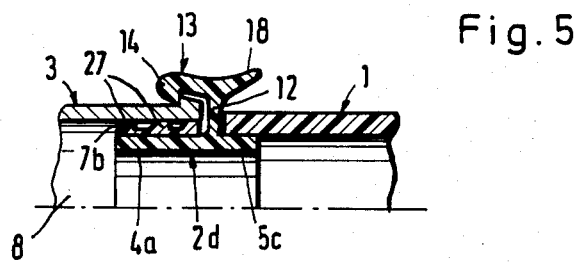
FIG. 5 is a similar sectional view of a coupling which constitutes a modification of the coupling shown in FIG. 4.

FIG. 5 shows another coupling which distinguishes from the coupling of FIG. 4 in that the second section 5c of the connector 2d has the same inner and outer diameters as the first section 4a and is received in the end portion of the hose 1. Furthermore, the sleeve-like sealing element 7b of the coupling which is shown in FIG. 5 has several external sealing lips 27 in sealing engagement with the cylindrical internal surface 8 of the end portion of the pipe 3. The external surface of the second section 5c is vulcanized or otherwise bonded to the internal surface of the end portion of the hose 1, and the external surface of the section 4a is vulcanized or otherwise bonded to the internal surface of the sealing element 7b. The inclination of the additional portion 18 of the latching device 13 which is shown in FIG. 5 resembles that of the additional portion 18 shown in FIG. 1. The web 12 of the latching device 13 of FIG. 5 is flanked by the end faces of the end portions of the pipe 3 and hose 1.

Figure 6:
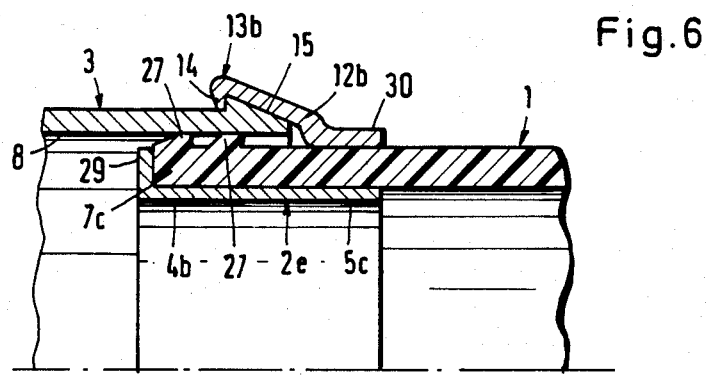
FIG. 6 is a fragmentary axial sectional view of a coupling wherein the latching element or elements are not integral with a metallic connector.

Referring to FIG. 6, there is shown a further coupling wherein the latching device 13b is not integral with a metallic connector 2e. Furthermore, the sleeve-like sealing element 7c is integral with the end portion of the hose 1 and has two deformable external lips 27 in sealing engagement with the cylindrical internal surface 8 of the end portion of the pipe 3 which is identical with the pipe 3 of FIG. 1. The cylindrical first section 4b of the connector 2e has a radially outwardly extending collar 29 which abuts against the end face of the sealing element 7c, i.e., against the end face of the hose 1. The cylindrical external surface of the cylindrical section 4b and/or 5c of the connector 2e is bonded (e.g., vulcanized) to the cylindrical internal surface of the end portion of the hose 1. The manner in which the preferably thermoplastic material of the hose 1 can be bonded to the metallic material of the connector 2e is well known in the art and need not be described here.

The latching device 13b is integral with a metallic ring 30 whose internal surface is vulcanized or otherwise bonded to the end portion of the hose 1. The material of the ring 30 and latching device 13b can be identical with the material of the connector 2e. The latching device 13b comprises a first portion or web 12b which is elastically deformable and is integral with the ring 30, and a second portion including the pallet 14 which can engage the radial shoulder of the bead at the free end of the end portion of the pipe 3. The end portion of the hose 1 constitutes a means for indirectly attaching the latching device 13b to the connector 2e. The ring 30 can carry two or more discrete latching devices 13b, e.g., a complete annulus of closely adjacent latching devices.

An advantage of the coupling of FIG. 6, wherein the sealing element 7c is integral with the end portion of the hose 1, is that the sealing element need not be machined and mounted as a separate part. This contributes to a reduction of the initial and assembly cost of the coupling. Moreover, the seal between the pipe 3 and hose 1 is very reliable because an integral part (sealing element 7c) of the hose is moved into direct sealing engagement with the end portion of the pipe.

An advantage of the establishment of a bond between the end portion of the hose 1 and the respective section or sections 5b-26, 5c) of the connector 2c, 2d or 2e is that such bond invariably prevents leakage of fluid between the connector and the hose as well as that the fluidtight connection between the connector and the hose does not require the provision of additional parts (such as the clamp 11). Moreover, those surfaces or end faces of the hose and connector which are to be bonded to each other are preferably smooth cylindrical or radially extending surfaces which require much less machining or other treatment than the making of ribs and/or grooves in the external surface of the respective section of the connector. Still further, vulcanizing is a relatively simple operation which can be carried out in a fully automatic way in contrast to the application of a clamp or the like which can also be automated but at a higher cost. It has been found that the establishment of bonds by vulcanizing or another suitable technique ensures the establishment of connections which are highly reliable at pressures which are anticipated in pipelines employing the improved coupling.

Insertion of the second section (5c) of the connector 2d or 2e into the hose 1 in a manner as shown in FIGS. 5 and 6 is desirable and advantageous on the additional ground that the normally radially expanded end portion of the hose contributes to the establishment of an even more reliable seal between the connector and the hose.

The provision of one or more lips 27 on the sealing element 7a, 7b or 7c is desirable and advantageous because the inner diameter of the end portion of the pipe 3 need not be selected with a high degree of precision, i.e., the deformable lip or lips compensate for eventual deviations of the diameter of the internal surface 8 from an optimum diameter. Moreover, the internal surface 8 need not be machined with a high degree of precision.

Figure 7:
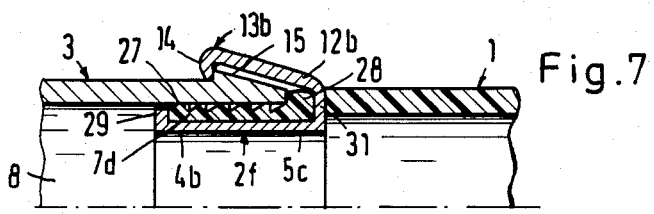
FIG. 7 is a similar sectional view of a coupling which constitutes a modification of the coupling shown in FIG. 6 and wherein the latching device or devices are integral with the metallic connector.

FIG. 7 shows a coupling wherein the connector 2f consists of sheet metal and a portion of its second section 5c surrounds the respective end portion of the sleeve-like sealing element 7d. The second section 5c includes a radially outwardly extending flange 31 which is disposed between the end face of the end portion of the hose 1 and the adjacent end portion of the sealing element 7d. The latching device 13b is integral with the flange 31. The sealing element 7d has a bead 28 corresponding to that which is shown in FIG. 4 and a set of coaxial axially spaced sealing lips 27 which engage the cylindrical internal surface 8 of the end portion of the pipe 3. The latter is identical with the pipe 3 of FIG. 1. The end face of the hose 1 is bonded (e.g., vulcanized) to the flange 31 of the connector 2f. The axial length of the sealing element 7d approximates that of the connector 2f; the left-hand end face of this sealing element abuts against the radially outwardly extending collar 29 of the first section 4b of the connector 2f. It is preferred to establish a permanent bond (e.g., by vulcanizing) between the cylindrical internal surface of the element 7d and the cylindrical external surface of the connector 2f all the way between the flange 31 and collar 29.

Figure 8:
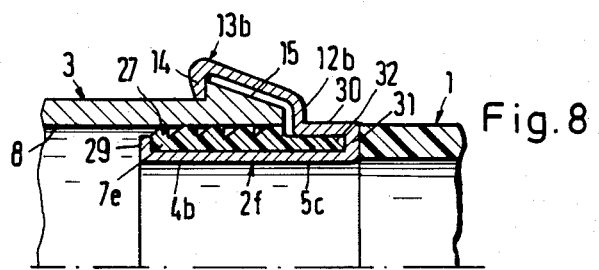
FIG. 8 illustrates a modification of the coupling which is shown in FIG. 7.
Figure 9:
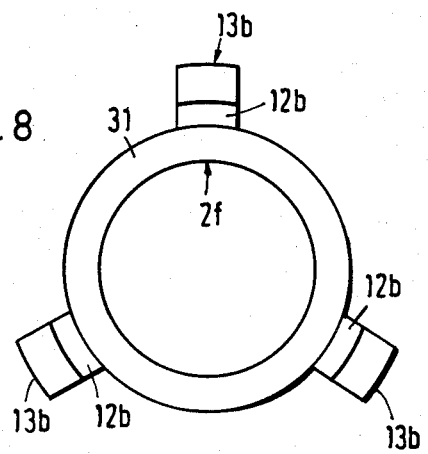
FIG. 9 is an end elevational view of the connector which forms part of the coupling shown in FIG. 8.

The coupling of FIGS. 8 and 9 is similar to the coupling of FIG. 7 except that the bead 28 of the sealing element 7d is replaced with a cylindrical end portion 32 which is confined between two concentric parts of the second section 5c. The end portion 32 of the sealing element 7e can be sealingly clamped between the outer part 30 and the radially inwardly adjacent inner part of the second section 5c. The part 30 is connected with the inner part of the second section 5c by the radially extending flange 31 whose outer side is bonded (e.g., vulcanized) to the adjacent end face of the hose 1. In addition to having its end portion 32 clamped between the parts of the second section 5c, the internal surface of the sealing element 7e can be bonded to the external surface of the first section 4b or to the external surface of the first section 4b as well as to the external surface of the radially inner part of the second section 5c of the metallic connector 2f. FIG. 9 shows that the flange 31 of the second section 5c of the connector 2f is integral with three equidistant latching devices 13b with elastic webs 12b and second portions including pallets 14 which normally engage the radial shoulder of the bead including the frustoconical flank 15 shown in FIG. 8. It is clear that the number of latching devices 13b can be reduced to less than three or increased to four or more.

An advantage of the coupling which is shown in FIGS. 8 and 9 is that the connector 2f is not only sealingly bonded to but is also in mechanical sealing engagement with (the portion 32 of) the sealing element 7e. Moreover, the part 30 can resile with the webs 12b so that the elasticity of each latching device 13b in the region of the parts 12b and 30 is quite pronounced and the pallets 14 can more readily slide along the flank 15 on their way toward engagement with the readial shoulder at the free end of the end portion of the pipe 3. Still further, the end portion of hose 1 can be bonded to the flange 31 (as actually shown in FIG. 8) or to the external surface of the part 30 of the second section 5c. The bonding of the end face of the hose 1 to the flange 31 in a manner as shown in FIG. 8 is preferred at this time because the internal surface of the hose 1 is at least substantially flush with the internal surface of the connector 2f so that the parts 2f and 1 do not interfere with the flow of a fluid medium through the assembled coupling.

Figure 10:
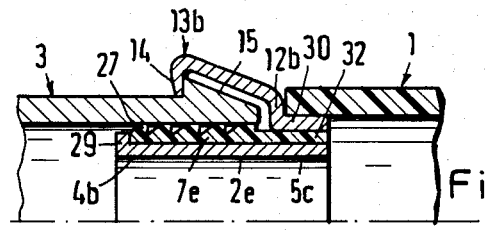
FIG. 10 is a fragmentary axial sectional view of a coupling constituting a modification of the coupling which is shown in FIGS. 8 and 9.

FIG. 10 shows a coupling which is similar to the coupling of FIGS. 8 and 9 except that the ring 30 which carries one or more latching devices 13b is indirectly affixed to the connector 2e by the right-hand end portion 32 of the sealing element 7e. The left-hand end portion of the sealing element 7e has a set of five sealing lips 27 in contact with the cylindrical internal surface of the pipe 3. The end portion of the hose 1 surrounds and is bonded to the ring 30, the internal surface of the ring 30 is bonded to the external surface of the second section 5c, and the internal surface of the sealing element 7e is bonded to the external surface of the connector 2e of FIG. 10.

Figure 11:
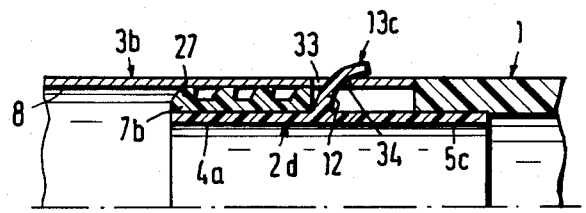
FIG. 11 is a fragmentary axial sectional view of a further coupling wherein the latching device extends outwardly through an opening in the end portion of the pipe.

Referring to FIG. 11, there is shown a coupling comprising a metallic pipe 3b whose end portion has at least one opening 33, namely one opening for each latching device 13c. The latter is integral with the connector 2d which is an elongated cylinder having a first section 4a bonded to the internal surface of the sleeve-like sealing element 7b and a second section 5c bonded directly to the internal surface of the end portion of the hose 1. FIG. 11 shows that the outer side of the latching device 13c is curved outwardly and away from the sealing element 7b so that the device 13c is automatically depressed radially inwardly by pivoting in the region of its web 12 when the end portion of the pipe 3b is slipped over and beyond the sealing element 7b, i.e., when the pipe 3b is moved in a direction to the right and the parts 1, 2d and 7b are held against axial movement, when the parts 1, 2d and 7b are moved axially to the left and the pipe 3b is held against axial movement or when the pipe 3b is moved to the right and the parts 1, 2d, 7b are moved to the left, as viewed in FIG. 11. The second or outer portion of the latching device 13c of FIG. 11 is depressed by the end face of the end portion of the pipe 3b when such end face advances beyond the sealing element 7b to move toward and into abutment with the end face of the hose 1. The person assembling the coupling of FIG. 11 must ensure that the latching device 13c is aligned with the opening 33 so that the second portion of this device can move radially outwardly under the action of the elastically deformable web 12 when the device 13c registers with the opening 33. The surface 34 bounding a portion of the opening 33 reduces the likelihood of accidental separation of the end portion of the pipe 3b from the lips 27 of the sealing element 7b and from the latching device 13c. The surface 34 performs the function of the radial shoulder 17 which is shown in FIG. 1.

The internal surface of the end portion of the hose 1 is bonded (e.g., vulcanized) to the external surface of the second section 5c of the connector 2d of FIG. 11. The internal surface of the sealing element 7b is bonded to the external surface of the first section 4a. As shown in FIG. 11, the end face of the hose 1 can actually abut against the end face of the pipe 3b.

Figure 12:
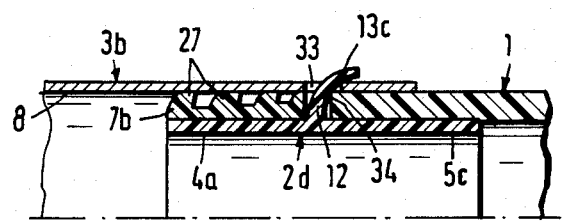
FIG. 12 is a similar view of a first modification of the coupling which is shown in FIG. 11.

FIG. 12 illustrates a modification of the coupling which is shown in FIG. 11. The main difference is that the end portion of the hose 1 is received between the end portion of the pipe 3b and the second section 5c of the connector 2d. The external surface of the second section 5c is bonded to the internal surface of the end portion of the hose 1, and the internal surface of the sleeve-like sealing element 7b is bonded to the external surface of the first section 4a. The coupling of FIG. 12 can establish a highly satisfactory seal between the end portions of the pipe 3b and hose 1.

Figure 13:
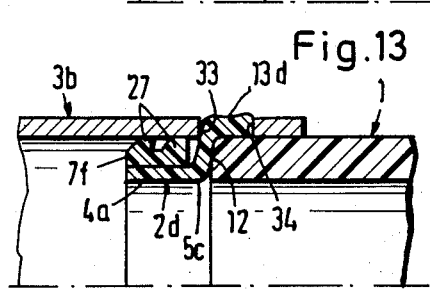
FIG. 13 is a similar view of a second modification of the coupling which is shown in FIG. 11.

FIG. 13 shows a second modification of the coupling which is illustrated in FIG. 11. The connector 2d has a relatively short first section 4a whose external surface is bonded to the sleeve-like sealing element 7f and an even shorter second section 5c including a radially outwardly extending web 12 constituting an integral first portion of the latching device 13d. The second portion of the latching device 13d is nearly completely received in the opening 33 of the end portion of the pipe 3b and abuts against the surface 34 to be thereby held against accidental or unintentional disengagement from the end portion of the pipe. The end face of the end portion of the hose 1 is bonded to a portion of or to the entire web 12. In the embodiment of FIG. 13, the opening 33 of the end portion of the pipe 3b is nearly completely filled by the second or outer portion of the latching device 13d. The coupling of FIG. 13 can be modified by replacing the connector 2d with a connector 2f of the type shown in FIG. 8 but the configuration of the second portion of the latching device preferably remains unchanged so that such second portion can fill or nearly fill the opening 33 in the end portion of the pipe 3b. The section 5c of the connector 2d shown in FIG. 13 can be provided with a complete annulus of latching devices 13d which are bonded to the end face of the hose 1 to ensure that the connector 2d invariably shares all axial movements of the hose and vice versa. As mentioned above, the sealing element 7f of FIG. 13 is bonded to the section 4a.

Figure 14:
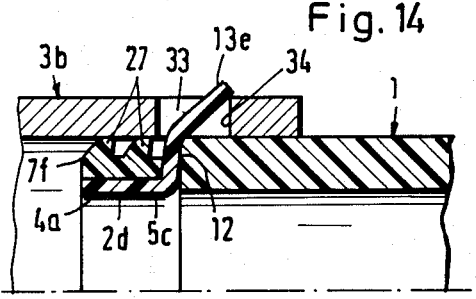
FIG. 14 is a similar view of a third modification of the coupling which is shown in FIG. 11.

The coupling of FIG. 14 differs from the coupling of FIG. 13 in that the second or outer portion of the latching device 13e fills only a part of the opening 33 in the end portion of the pipe 3b. As can be readily seen in FIG. 14, the second portion of the latching device 13e slopes outwardly and away from the periphery of the end portion of the hose 1 in a direction away from the sealing element 7f. The purpose of the surface 34 in the opening 33 is the same as the purpose of the radial shoulder 17 in the coupling of FIG. 1 or of the surface 34 in the coupling of FIG. 11.

An advantage of the couplings which are shown in FIGS. 11 to 14 is that the free end of the pipe 3b need not be provided with an external bead but merely with an opening 33 for each of the latching devices 13c, 13d or 13e or with one opening for two or more neighboring latching devices. Furthermore, the latching devices 13c, 13d and 13e are much simpler and hence less expensive than the previously described latching devices.

Figure 15:
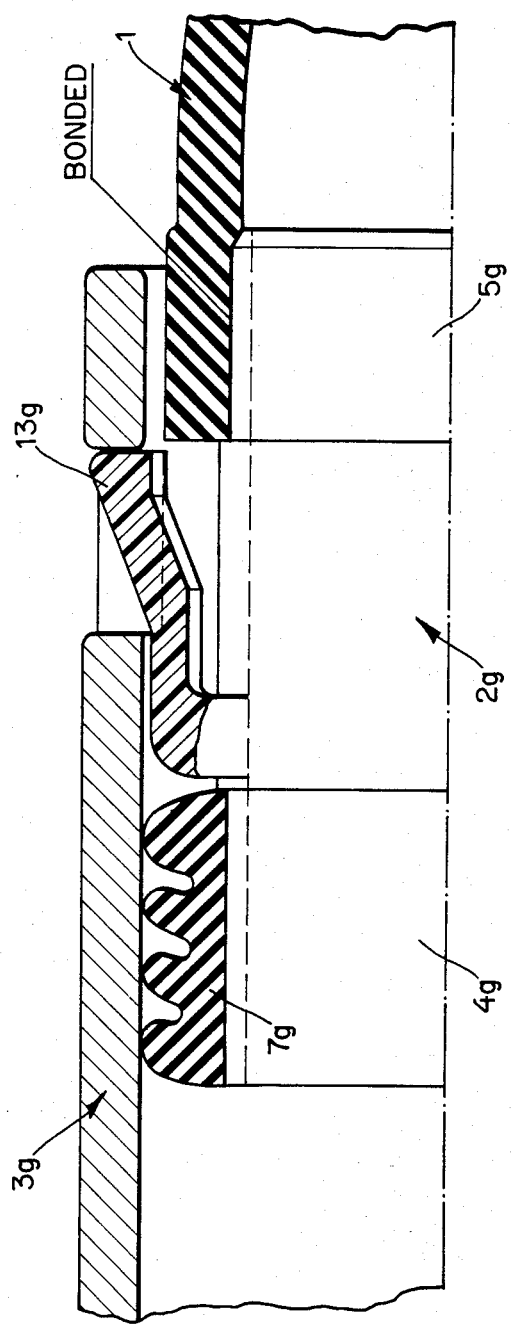
FIG. 15 is a similar view of a fourth modification of the coupling which is shown in FIG. 11.

The hose coupling of FIGS. 15-16 is similar to the hose couplings of FIGS. 11-14. It comprises a modified connector 2g which is bonded to the end portion of the hose 1 and carries three equidistant latching devices 13g each having an outermost part fully received or receivable in the corresponding opening 33g in the end portion of the metallic pipe 3g. The right-hand section 5g of the connector 2g extends into the end portion of the hose 1 and the left-hand section 4g of the connector 2g is surrounded by and can be bonded to the sealing element 7g. The end portion of the pipe 3 surrounds the end portion of the hose 1 when the coupling of FIGS. 15-16 is fully assembled. The section 5g maintains the end portion of the hose 1 in expanded condition. In order to disengage the pipe 3 from the hose 1, the radially outermost portions of the latching devices 13g must be depressed radially inwardly beyond the respective openings 33g.

All of the illustrated couplings exhibit the advantage that the latching devices are at least indirectly carried by the connector. This reduces the overall cost of the couplings and simplifies the assembly of their parts. In practically all embodiments of the invention, the connector can be assembled with the latching device or devices, with the sealing element and with the hose in the manufacturing plant so that its first section is merely pushed into the end portion of the pipe 3, 3a or 3b in order to complete the assembly of the coupling.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A coupling comprising a pipe having a first end portion; a hose having a second end portion; a tubular connector having a first section surrounded by said first end portion and a second section in sealing engagement with said second end portion, said second section being arranged to share axial movements of said second end portion; a sealing element interposed between said first section and said first end portion to establish and maintain a fluidtight seal therebetween while permitting at least some axial movement of said first end portion and said first section relative to each other; and at least one latching device for releasably locking said connector to said pipe, said latching device including a mobile first portion which is rigid with said connector and a second portion which is movable into and from engagement with said pipe, said first end portion having an opening and said latching device extending into said opening.

2. The coupling of claim 1, wherein said first end portion has an at least substantially cylindrical internal surface and said sealing element includes an annulus which is in contact with said internal surface.

3. The coupling of claim 1, wherein at least a portion of said connector is a cylinder.

4. The coupling of claim 1, wherein said first portion of said latching device defines for said second portion a pivot axis which is at least substantially tangential to said first end portion so that said second portion is movable in a plane which includes the axis of said first end portion.

5. The coupling of claim 1, wherein said first portion of said latching device includes an elastically deformable web which secures said device to said connector.

6. The coupling of claim 1, wherein at least said second portion of said latching device is freely accessible at the exterior of said first end portion.

7. The coupling of claim 1, wherein said second section is at least partly confined in said second end portion and said latching device includes a joint which secures said second portion to said connector and is disposed between said end portions.

8. The coupling of claim 1, wherein said second section is bonded to said second end portion.

9. The coupling of claim 1, wherein said second section is vulcanized to said second end portion.

10. The coupling of claim 1, wherein at least a portion of said second section is surrounded by said second end portion.

11. The coupling of claim 1, wherein said second end portion abuts said first end portion and surrounds said second section.

12. The coupling of claim 1, wherein one of said end portions surrounds a portion of the other of said end portions.

13. The coupling of claim 1, wherein said sealing element comprises at least one circumferentially complete deformable sealing lip.

14. The coupling of claim 1, wherein said sealing element is bonded to said connector.

15. The coupling of claim 1, wherein the second portion of said latching device is fully received in said opening.

16. The coupling of claim 1, comprising a plurality of latching devices, said first end portion having an opening for each of said latching devices.

17. The coupling of claim 16, wherein said latching devices are equidistant from each other in the circumferential direction of said first end portion.

18. The coupling of claim 1, wherein said opening is adjacent said second end portion.

19. The coupling of claim 1, wherein said second section has a first portion surrounded by said second end portion and a second portion disposed between the first portion of said second section and said first section, said latching device being integral with the second portion of said second section.

20. The coupling of claim 1, wherein said connector is at least slightly elastic and said first portion of said latching device is movable to and from a position in which the second portion of said latching device extends into said opening.

* * * * *